United States Patent
Phillips

(10) Patent No.: US 9,774,182 B2
(45) Date of Patent: Sep. 26, 2017

(54) INTELLIGENT SOLID-STATE INTEGRATED CROWBAR/CIRCUIT BREAKER

(71) Applicant: The United States of America as represented by the Secretary of the Navy, Washington, DC (US)

(72) Inventor: David Burns Phillips, La Mesa, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 188 days.

(21) Appl. No.: 14/734,557

(22) Filed: Jun. 9, 2015

(65) Prior Publication Data

US 2016/0365724 A1 Dec. 15, 2016

(51) Int. Cl.
  *H02H 9/04* (2006.01)
  *H02H 3/20* (2006.01)

(52) U.S. Cl.
  CPC ............ *H02H 9/041* (2013.01); *H02H 3/202* (2013.01)

(58) Field of Classification Search
  CPC .......... H02H 3/087; H02H 5/04; H02H 9/041; H02H 3/08; H02H 3/20; H02H 3/202; H02H 3/44; H02H 3/445
  See application file for complete search history.

(56) References Cited

U.S. PATENT DOCUMENTS

| 3,365,675 A * | 1/1968 | Gaddy | H02H 3/087 327/467 |
| 3,526,811 A * | 9/1970 | Shrader | H02H 3/023 315/36 |
| 6,587,027 B1 * | 7/2003 | Nadd | H02H 3/087 337/167 |
| 2003/0048317 A1 * | 3/2003 | Usui | B41J 29/393 347/14 |

(Continued)

OTHER PUBLICATIONS

Department of the Navy: Solid-State Combination Circuit Breaker/Crowbar; Federal Business Opportunities Solicitation, posted online at https://www.fbo.gov on Jul. 14, 2010.

(Continued)

*Primary Examiner* — Stephen W Jackson
*Assistant Examiner* — Christopher Clark
(74) *Attorney, Agent, or Firm* — SPAWAR Systems Center Pacific; Kyle Eppele; J. Eric Anderson

(57) ABSTRACT

An apparatus comprising: a solid-state series switch positioned between a transmitter's high-voltage, direct current (DC) bus and a high-voltage DC power source, wherein the series switch is configured to establish an open circuit between the transmitter and the power source upon receiving a first trip signal; a solid-state shunt switch operatively coupled in shunt between the transmitter high voltage DC bus and a ground, wherein the shunt switch is configured to provide a short-circuit path from the transmitter to ground upon receiving a second trip signal; and a controller electrically coupled to the series and shunt switches, wherein the (Continued)

controller is configured to generate the first and second trip signals in the event that the controller receives a trouble signal from the transmitter, and wherein the first trip signal is sent to the series switch before the second trip signal is sent to the shunt switch.

14 Claims, 5 Drawing Sheets

(56) References Cited

U.S. PATENT DOCUMENTS

2009/0021874 A1* 1/2009 Divito .................... H02H 3/023
 361/57
2014/0037294 A1* 2/2014 Cox ....................... H04B 10/07
 398/115

OTHER PUBLICATIONS

Brad Graves; Strategic Asset, Spawar is Key Player in the Navy and in the Region, San Diego Business Journal, vol. 35, No. 18, May 5-11, 2014.
Jtozer; Meet the Scientists: Dr. Dave Phillips; Armed with Science, The Official US Defense Department Science Blog; available online at http://science.dodlive.mil/2014/07/14/meet-the-scientists-dr-dave-phillips/ on Jul. 14, 2014.
Burns; Solid-State Integrated Crowbar/Circuit Breaker; poster displayed at AFCEA West Conference Feb. 2013.

* cited by examiner

INTELLIGENT SOLID-STATE INTEGRATED CROWBAR/CIRCUIT BREAKER

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 103681.

BACKGROUND OF THE INVENTION

Some transmitters that utilized high-power vacuum tubes are susceptible to damage by transient conditions within the devices and/or temporary anomalies within the tubes themselves. Should any of the conditions occur, and power continues to be provided to the tubes there is a significant risk of damaging the tubes beyond repair. Previously, to alleviate these concerns, a "crowbar" circuit was implemented within the transmitter using a mercury ignitron tube and multiple sensing circuits within the transmitter were configured to detect problematic conditions developing within the transmitter and to send an initiate signal to the ignitron. The ignitron would then provide a direct short-circuit of the power supply to ground, depriving the tubes of power and also draining stored energy within the transmitter away from the tubes. This short circuit would remain in effect until the protective relays in the power system detected the short circuit and tripped the associated circuit breaker. The unfortunate side-effect of this operation is that it places incredible electromagnetic stresses on the power supply equipment and draws substantial energy from the power system. This also causes a significant drop in system voltage until the short circuit is removed. There exists a need for an improved protective circuit.

SUMMARY

The invention disclosed herein is an apparatus comprising: a solid-state series switch, a solid-state shunt switch, and a controller. The solid-state series switch is positioned between a transmitter's high-voltage, direct current (DC) bus and a high-voltage DC power source. The solid-state series switch is configured to establish an open circuit between the transmitter and the power source upon receiving a first trip signal. The solid-state shunt switch is operatively coupled in shunt between the transmitter high voltage DC bus and a ground. The shunt switch is configured to provide a short-circuit path from the transmitter to ground upon receiving a second trip signal. The controller is electrically coupled to the series switch and the shunt switch. The controller is configured to generate the first and second trip signals in the event that the controller receives a trouble signal from the transmitter indicating that a problematic condition exists within a high voltage system of the transmitter. The first trip signal is sent to the series switch before the second trip signal is sent to the shunt switch.

The invention may also be described as a method comprising the following steps. The first step provides for monitoring with a controller a communications system of a high-voltage system for trouble signals indicating a problematic condition with the high-voltage system. The next step provides for establishing an open circuit between the high-voltage system and a high-voltage power source upon receiving a first trip signal from the controller. The next step provides for providing a short-circuit path to ground within the high-voltage system upon receiving a second trip signal from the controller only after the open circuit has been established such that stored energy within the high-voltage system is drained away from components of the high-voltage system and such that the high-voltage power source is never exposed to the short-circuit path to ground.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
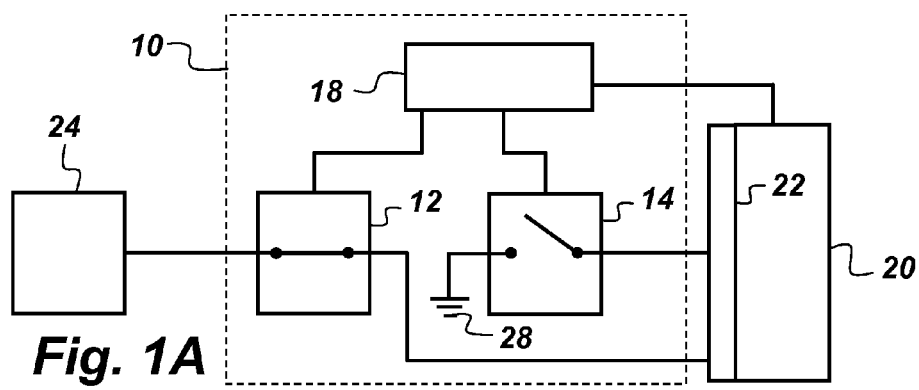
FIGS. 1A-1C are time-sequence illustrations of an embodiment of an intelligent crowbar/circuit breaker.
Figure 1B:
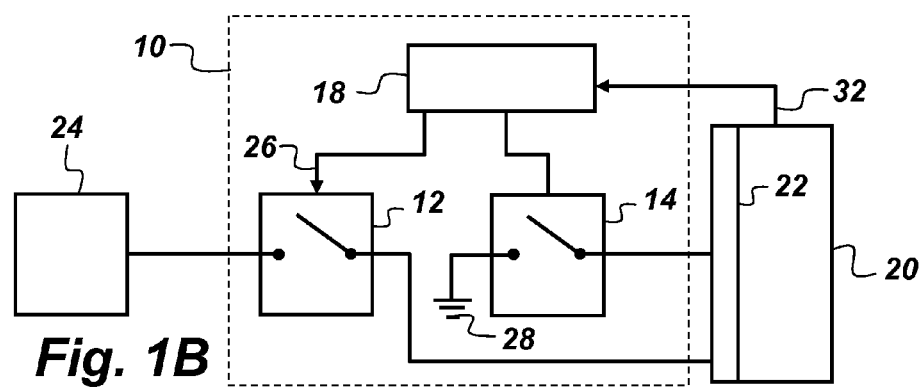
Figure 1C:
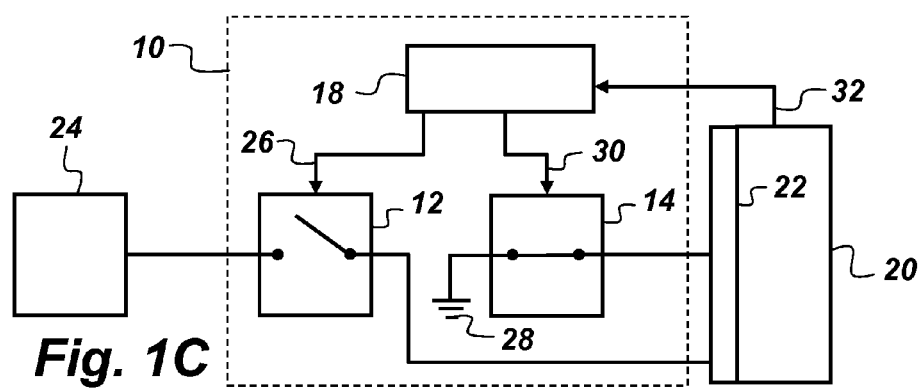

FIGS. 1A-1C are illustrations of an embodiment of an intelligent solid-state, integrated crowbar/circuit breaker, hereinafter referred to as the intelligent crowbar 10. The intelligent crowbar 10 comprises, consists of, or consists essentially of a solid-state series switch 12, a solid-state shunt switch 14, and a controller 18. The solid-state series switch 12 may be positioned between a transmitter 20's high-voltage, direct current (DC) bus 22 and a high-voltage DC power source 24. FIG. 1A shows the series switch 12 and the shunt switch 14 in operational configurations, where the series switch 12 is closed and the shunt switch 14 is open. The solid-state series switch 12 may be configured to establish an open circuit between the transmitter 20 and the power source 24 upon receiving a first trip signal 26, such as is shown in FIG. 1B. The shunt switch 14 may be operatively coupled in shunt between the transmitter 20's high voltage DC bus 22 and a ground 28. The shunt switch 14 may be configured to provide a short-circuit path from the transmitter 20 to ground 28 upon receiving a second trip signal 30, as shown in FIG. 1C. The controller 18 may be electrically coupled to the series switch 12 and the shunt switch 14. The controller 18 may be configured to generate the first and second trip signals 26 and 30 in the event that the controller receives a trouble signal 32 from the transmitter 20 indicating that a problematic condition exists within a high voltage system of the transmitter 20. The controller 18 may be configured to send the first trip signal 26 to the series switch 12 (See FIG. 1B) before the controller 18 sends the second trip signal 30 to the shunt switch 14 (See FIG. 1C). This ensures that the DC power source 24 is never exposed (even momentarily) to the short circuit path to ground 28 through the shunt switch 14.

The series switch 12 may be any solid-state circuit breaker capable of creating an open circuit in a high-voltage system in 1 microsecond or less in response to receiving the first trip signal 26. The first trip signal 26 must not be a short circuit condition caused by the shunt switch 14 establishing a ground connection.

The shunt switch 14 may be any switch capable of connecting the transmitter 20 to ground. A suitable example of the shunt switch 14 includes, but is not limited to, two 10 kV-rated MiniMod switchplates manufactured by Diversified Technologies, Inc. The shunt switch 14 may comprise a dump current limiting resistor. A suitable example of a dump current limiting resistor is, but is not limited to, a 60 Ohm bulk ceramic resistor designed to limit current through the shunt switch 14.

The controller 18 may be any processor capable of interfacing with a control center and of controlling the series and shunt switches 12 and 14. The controller 18 may provide Pulse-Width Modulation control on power up. The controller 18 may also provide an Ethernet connection to a transmitter programmable logic controller (PLC) cabinet, where communications with the transmitter 20 may be established. The controller 18 manages the switching sequence, status and fault indications. The controller 18 initiates the first and second trip signals for each switch. Since the controller 18 operates the series switch 12 and the shunt switch 14, the controller 18 knows the status of each of the switches and can operate correctly and in rapid succession if necessary. The controller 18 may also contain MODBUS® registers for all information the transmitter requires. MODBUS® is a serial communications protocol for use with PLCs. These registers can also be set to control the operations of the series and shunt switches 12 and 14.

The transmitter 20 may be any high-voltage transmitter. For example, the transmitter 20 may be, but is not limited to a very low frequency (VLF) tube-type transmitter such as the Fixed Submarine Broadcast System (FSBS). The VLF FSBS transmitters utilize expensive high power vacuum tubes. These tubes are very expensive and also susceptible to damage by transient conditions within the transmitter and temporary anomalies within the tubes themselves. The intelligent crowbar 10 provides the protective, short circuit path through the shunt switch 14, for energy to be directed away from the large vacuum tubes while additionally providing an open circuit through the series switch 12 which opens the power connection to the transmitter 20 eliminating, from the perspective of the power source 24, the direct short circuit applied in the transmitter 20. The intelligent crowbar 10 eliminates the need for an ignitron tube, which removes the hazardous material from the site, and eliminates the short circuit in the power system reducing stresses in the power chain.

DC power source 24 may be any high-voltage power source. Suitable examples of the DC power source 24 include, but are not limited to, a commercial power grid, a rectification system, and a generator. There are few DC lines on the power grid, mostly long runs and reliability grid (10 across the US) interconnections. Solar power could be used but only if the voltage and power levels were sufficient to power the transmitter 20.

Figure 2:
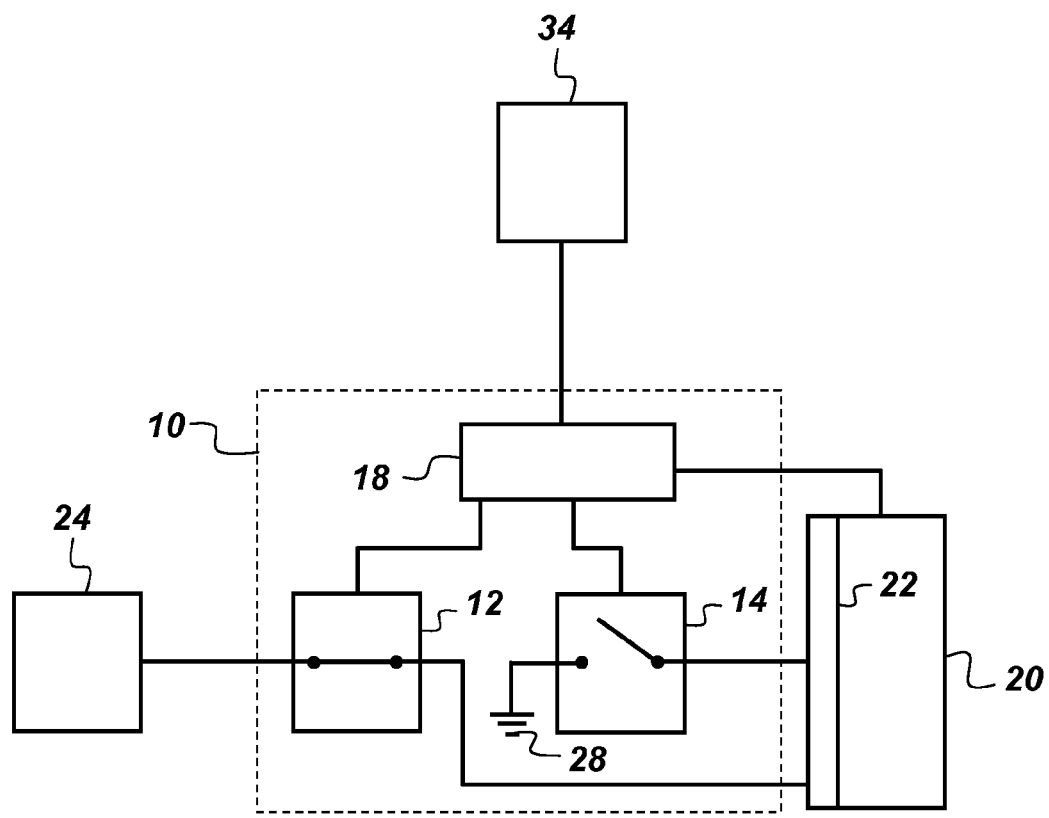
FIG. 2 is an illustration of an embodiment of an intelligent crowbar/circuit breaker.

FIG. 2 is an illustration of an embodiment of the intelligent crowbar 10 connected to a control center 34. The intelligent crowbar 10 is capable of supervisory control and data acquisition (SCADA). The controller 18 may serve as a remote terminal unit (RTU) by receiving outputs from sensors on the transmitter 20 and converting the sensor outputs to digital signals that may be forwarded to the supervisory control center 34. A telemetry system may be used to connect the controller 18 with the supervisory control center 34, and/or data warehouses. Examples of wired telemetry media used in SCADA systems include leased telephone lines and wide area network (WAN) circuits. Examples of wireless telemetry media used in SCADA systems include satellite, licensed and unlicensed radio, cellular and microwave. Most control actions may be performed automatically by the controller 18. Host control functions may be restricted to basic overriding or supervisory level intervention. For example, the controller 18 may control opening and closing of the series and shunt switches 12 and 14, but the SCADA system in the control center 34 may allow operators to change the set points for which trouble signals 32 trigger the first and second trip signals 26 and 30, and enable alarm conditions, such as high temperature, to be displayed and recorded. The feedback control loop passes through the controller 18, while the SCADA system in the control center 34 monitors the overall performance of the loop. Sensor readings from the transmitter 20 may be received at the controller 18 and status reports may then be communicated to the control center 34 as required. Data may be compiled and formatted in such a way that a control room operator can make supervisory decisions to adjust or override normal controller 18 controls. Data may also be fed to a memory database, to allow trending and other analytical auditing.

An operator in the control center 34 may issue a priority override signal to the controller 18 to operate in battle-short mode. A battle-short operation is where one accepts that there will be damage incurred to the transmitter 20, however the importance of a signal being transmitted overrides the concern for the health and wellbeing of the transmitter 20. When the control center 34 implements battle-short mode, the controller 18 holds in abeyance the steps of establishing the open circuit and providing the short-circuit until the priority override signal is countermanded even if irreversible damage to the transmitter 20 results. When in battle-short mode, the transmitter 20 will continue to operate until the need to send messages is gone as determined by the control center 34 or the transmitter 20 has sustained such damage that it can no longer operate and needs repair.

Figure 3:
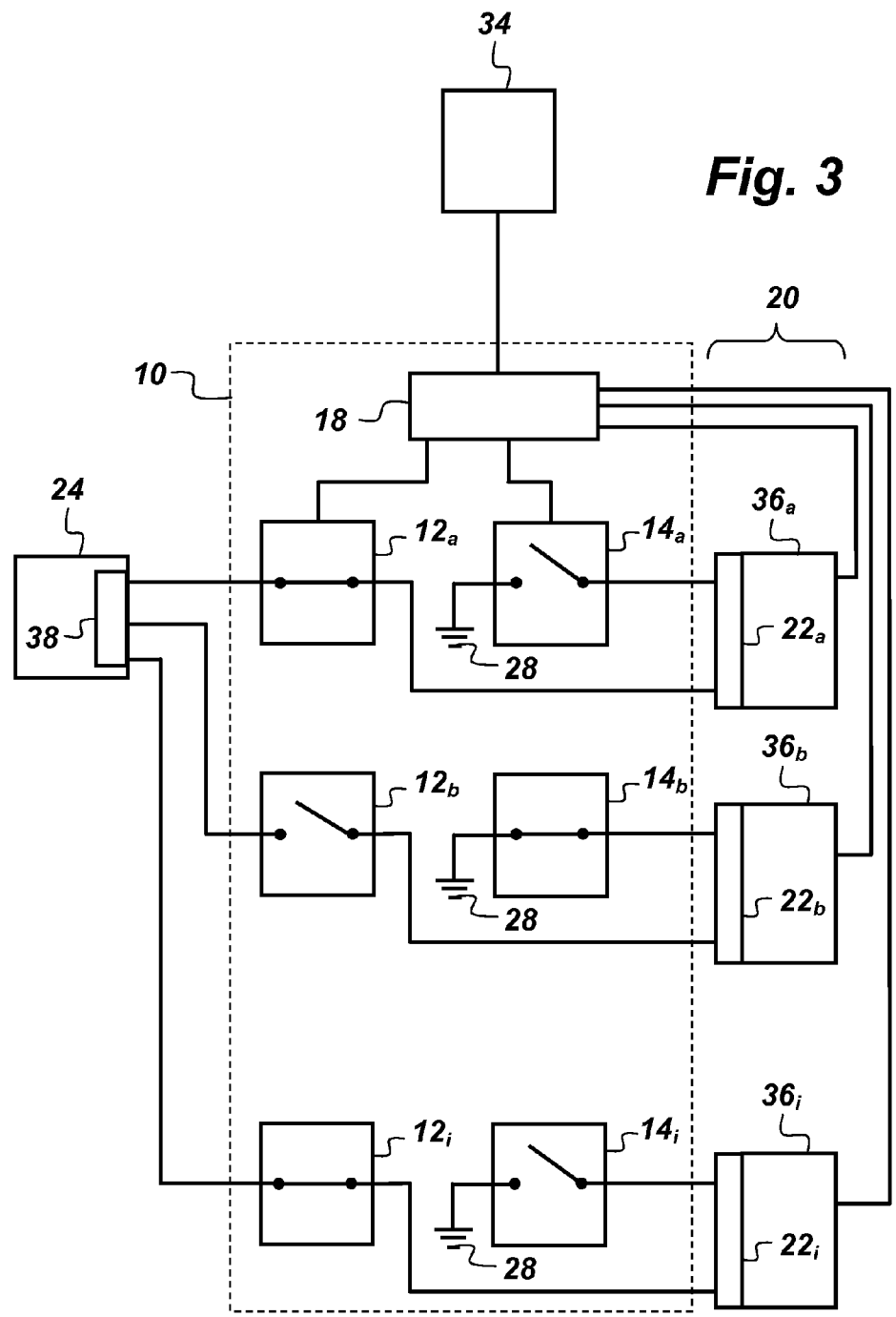
FIG. 3 is an illustration of an embodiment of an intelligent crowbar/circuit breaker.

FIG. 3 is an illustration of an embodiment of the intelligent crowbar 10 that comprises a plurality of series and shunt switches 12 and 14. In this embodiment, the transmitter 20 comprises a plurality of power amplifiers (PAs) 36. The transmitter 20 may have any desired number of PAs 36. In this embodiment, the controller 18 may be configured to only open the series switch 12 and close the shunt switch 14 that correspond to a PA 36 that is experiencing a problematic condition. In FIG. 3, PA $36_b$ is the PA experiencing the problematic condition so series switch $12_b$ has been opened and shunt switch $14_b$ has been closed. Since power is disconnected to the affected PA 36, one does not have to trip a main power breaker 38. Thus, if the controller 18 tests and finds the remainder of the transmitter 20 to be stable, it may be possible to leave the other PAs on line while decoupling only the faulted one. This would permit the transmitter 20 to continue to operate, at least to some degree, even in the event of problematic condition existing in one or more of its PAs 36. If allowing the other PAs 36 to continue to operate proves to be undesirable for any reason, the controller 18 may opt to open the DC connections to all the PAs 36 in the transmitter 20 until the problematic condition, or fault, clears. If the transmitter 20 has an unaffected PA 36 (i.e., a PA that is not experiencing a problematic condition) the controller 18 may take several actions, including, but not limited to: (1) opening the series switch 12 and closing the shunt switch 14 of the unaffected PA 36, (2) opening the series switch 12 and leaving the shunt switch 14 open of the unaffected PA 36, and (3) leaving the series switch 12 closed and the shunt switch 14 open of the unaffected PA 36.

It may be desirable to ensure that the power source 24 cannot see a short-circuit or it will try to feed it. By providing the series switch 12, the intelligent crowbar 10 decouples the affected PA 36 from the power source 24 before the affected PA 36 is short-circuited with the shunt switch 14. This reduces the amount of current the series switch 12 has to withstand (down from thousands of amps). The timing and order between the opening of the series switch 12 and the closing of the shunt switch 14 is important. The series switch 12 must be opened before the shunt switch 14 is closed. In one embodiment, the series switch 12 is opened 1 microsecond before the shunt switch 14 is closed. The controller may be configured to synchronize the openings and closings of the series switch 12 and the shunt switch 14. The controller may also perform pulse width modulation (PWM) sequencing during the closing of the series switch 12.

Figure 4:
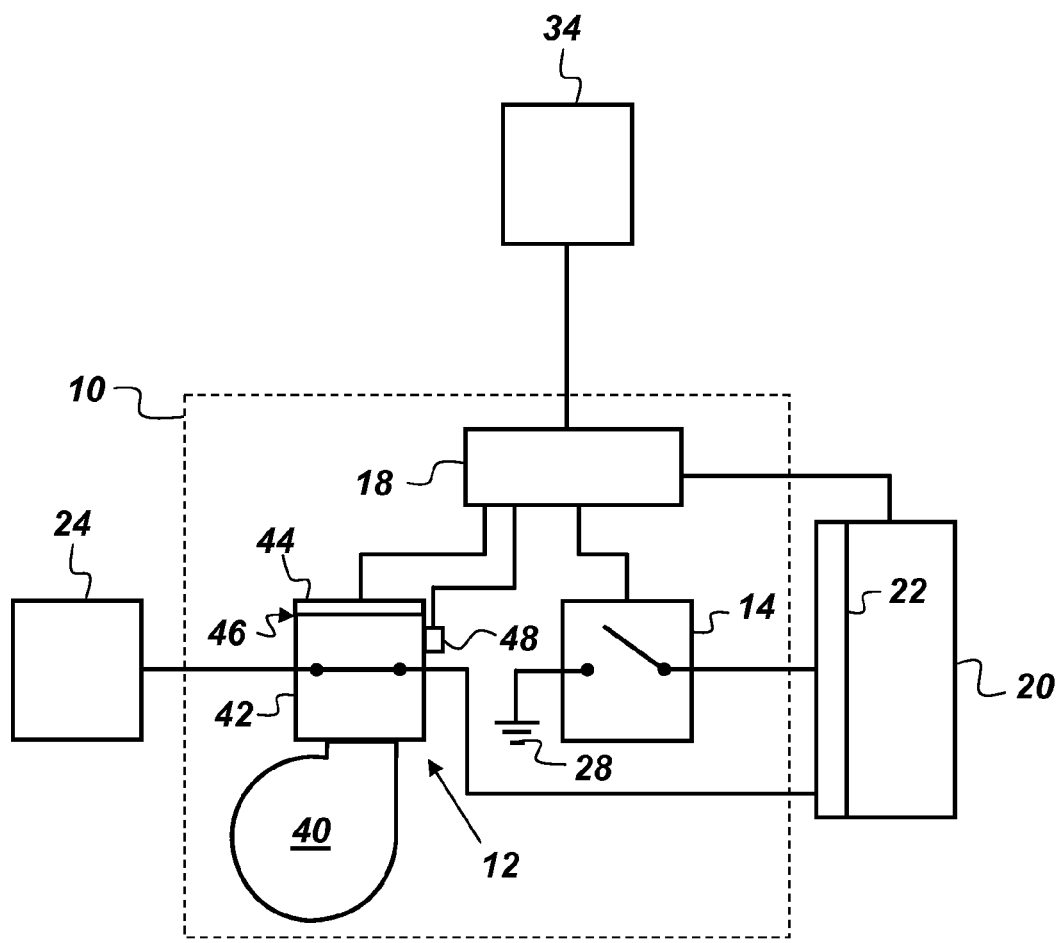
FIG. 4 is an illustration of an embodiment of an intelligent crowbar/circuit breaker.

FIG. 4 is an illustration of an embodiment of the intelligent crowbar 10 further comprising a blower assembly 40 configured to draw air through the series switch 14. The series switch 12 enclosure 42 may incorporate filter elements 44 at a front 46 of the enclosure 42 to filter incoming air. A pressure sensor 48 indicates the vacuum in the enclosure 42. If the vacuum sensed by the sensor 48 exceeds a predetermined threshold amount in-H20, or if an airflow switch opens while the blower 40 is operational, the air filter element(s) 44 may require cleaning or replacement. The airflow switch indicates blower function. It provides a switch closure to the controller 18. Status of the airflow switch is communicated over an Ethernet link to the control center 34. Low airflow faults may be ignored by the controller 18 if operating in battle-short mode. For example, the blower assembly 40 may draw air through the series switch 12 at a rate of approximately 900 cfm.

Figure 5:
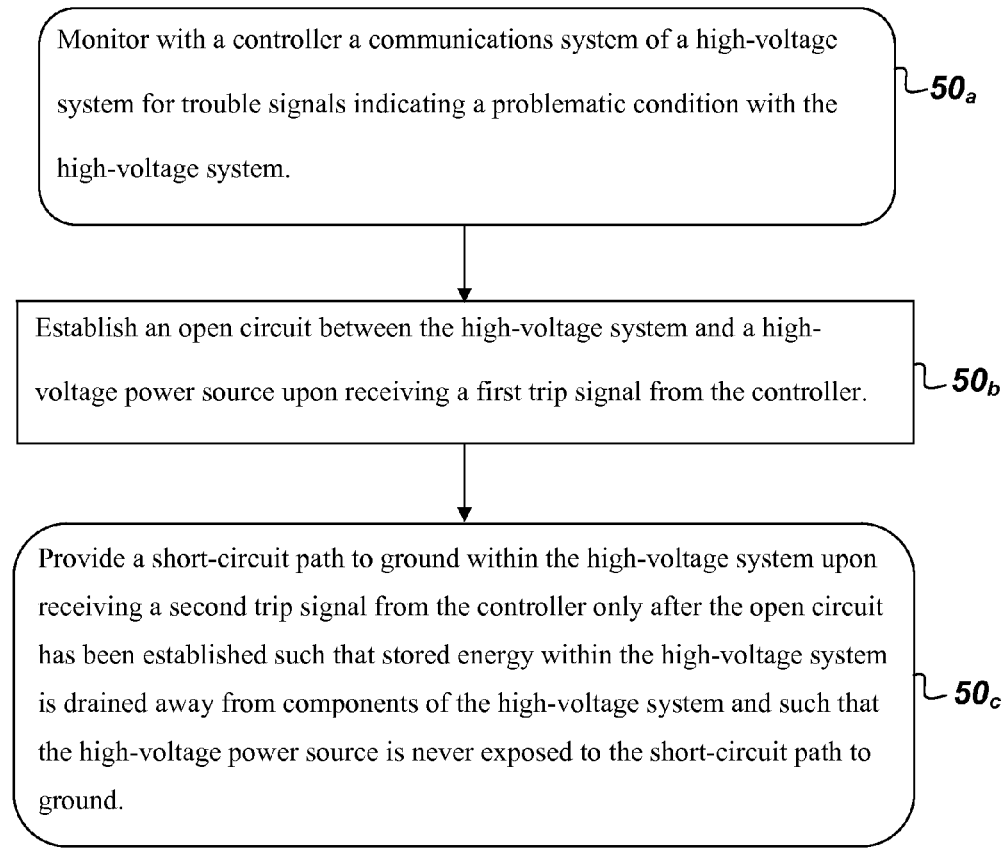
FIG. 5 is a flowchart of method for using an intelligent crowbar/circuit breaker.

FIG. 5 is a flowchart of a method 50 for using the intelligent crowbar 10. The first step $50_a$ provides for monitoring with the controller 18 a communications system of a high-voltage system for trouble signals indicating a problematic condition with the high-voltage system. The next step $50_b$ provides for establishing an open circuit between the high-voltage system and the high-voltage power source 24 upon receiving the first trip signal 26 from the controller 18. The next step $50_c$ provides for providing a short-circuit path to ground within the high-voltage system upon receiving a second trip signal 30 from the controller 18 only after the open circuit has been established such that stored energy within the high-voltage system is drained away from components of the high-voltage system and such that the high-voltage power source 24 is never exposed to the short-circuit path to ground 28.

From the above description of the intelligent crowbar 10, it is manifest that various techniques may be used for implementing the concepts of the intelligent crowbar 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the intelligent crowbar 10 is not limited to the particular embodiments described herein, but is capable of many embodiments without departing from the scope of the claims.

I claim:

1. An apparatus comprising:
   a solid-state series switch positioned between a transmitter's high-voltage, direct current (DC) bus and a high-voltage DC power source, wherein the solid-state series switch is configured to establish an open circuit between the transmitter and the power source upon receiving a first trip signal;
   a solid-state shunt switch operatively coupled in shunt between the transmitter high voltage DC bus and a ground, wherein the shunt switch is configured to provide a short-circuit path from the transmitter to ground upon receiving a second trip signal; and
   a controller electrically coupled to the series switch and the shunt switch, wherein the controller is configured to generate the first and second trip signals in the event that the controller receives a trouble signal from the transmitter indicating that a problematic condition exists within a high voltage system of the transmitter, and wherein the first trip signal is sent to the series switch before the second trip signal is sent to the shunt switch, and wherein the controller is configured to operate in battleshort mode upon receiving a priority override signal, wherein when in battleshort mode, the controller refrains from sending the first and second signals thereby exposing the transmitter to irreversible damage until the priority override signal is countermanded.

2. The apparatus of claim 1, further comprising a blower assembly operatively mounted to the series switch and configured to draw air through the series switch.

3. The apparatus of claim 2, wherein the blower assembly is configured to draw air through the series switch at approximately 900 cubic feet per minute.

4. The apparatus of claim 2, further comprising a filter element mounted to the series switch such that impurities are filtered out of incoming air drawn by the blower assembly.

5. The apparatus of claim 1, wherein the transmitter is a very low frequency (VLF) transmitter.

6. The apparatus of claim 5, wherein the transmitter comprises vacuum tubes.

7. The apparatus of claim 1, wherein the transmitter comprises a plurality of power amplifiers, each power amplifier comprising a high-voltage DC bus, and wherein the apparatus of claim 1 further comprises:
   a plurality of solid-state series switches, one for each power amplifier, wherein each series switch is positioned between a corresponding high-voltage DC bus and the high-voltage DC power source, wherein each solid-state series switch is configured to establish an open circuit between its corresponding power amplifier and the DC power source upon receiving the first trip signal;
   a plurality of solid-state shunt switches, one for each power amplifier, wherein each shunt switch is operatively coupled in shunt between its corresponding high voltage DC bus and the ground, wherein each shunt switch is configured to provide a short-circuit path from its corresponding power amplifier to ground upon receiving the second trip signal; and
   wherein the controller is electrically coupled to the plurality of series switches and shunt switches, and wherein the controller is configured to selectively send the first and second trip signals respectively to a given series switch and a given shunt switch that both correspond to an affected power amplifier.

8. The apparatus of claim 7, wherein there is a 1 microsecond delay between the first and second trip signals.

9. The apparatus of claim 1, wherein the first trip signal is not sent in reaction to sensing a short circuit condition.

10. A method comprising the steps of:
monitoring with a controller a communications system of a high-voltage system for trouble signals indicating a problematic condition with the high-voltage system;
generating a first trip signal and a second trip signal with the controller in response to receipt of a trouble signal;
establishing an open circuit between the high-voltage system and a high-voltage power source upon receiving the first trip signal from the controller;
providing a short-circuit path to ground within the high-voltage system upon receiving the second trip signal from the controller only after the open circuit has been established such that stored energy within the high-voltage system is drained away from components of the high-voltage system and such that the high-voltage power source is never exposed to the short-circuit path to ground; and
operating in battleshort mode upon receiving a priority override signal, wherein battleshort mode comprises holding in abeyance the steps of establishing the open circuit and providing the short-circuit until the priority override signal is countermanded even if irreversible damage to the transmitter results.

11. The method of claim 10, wherein the high-voltage system is a very low frequency (VLF) transmitter comprising a plurality of power amplifiers, and wherein the method of claim 10 further comprises the steps of:
establishing an open circuit between an affected power amplifier that is experiencing a problematic condition and the high-voltage power source upon receiving the first trip signal from the controller; and
providing a short-circuit path to ground only for the affected power amplifier.

12. The apparatus of claim 10, wherein the first trip signal is not sent in reaction to sensing a short circuit condition.

13. The apparatus of claim 10, wherein there is a 1 microsecond delay between establishing the open circuit and providing the short-circuit path to ground.

14. The apparatus of claim 11, further comprising the steps of:
continuing to operate unaffected power amplifiers; and
bringing the affected power amplifier back online by opening the shunt switch and then closing the series switch after the trouble signal disappears.

* * * * *